(12) United States Patent
Heckler et al.

(10) Patent No.: US 11,451,596 B2
(45) Date of Patent: Sep. 20, 2022

(54) MAINTAINING INDEPENDENT NETWORK CONNECTIONS FOR USER DEVICES IN CONFERENCING SESSIONS

(71) Applicant: Hewlett-Packard Development Company, L.P., Spring, TX (US)

(72) Inventors: Claudio Andre Heckler, Porto Alegre (BR); Renan Antunes, Barueri (BR); Gabriela Matias Navarro, Barueri (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/734,723

(22) PCT Filed: Oct. 22, 2018

(86) PCT No.: PCT/US2018/056930
§ 371 (c)(1),
(2) Date: Dec. 3, 2020

(87) PCT Pub. No.: WO2020/086056
PCT Pub. Date: Apr. 30, 2020

(65) Prior Publication Data
US 2021/0243237 A1 Aug. 5, 2021

(51) Int. Cl.
*H04L 65/403* (2022.01)
*H04L 12/18* (2006.01)

(52) U.S. Cl.
CPC ...... *H04L 65/4046* (2013.01); *H04L 12/1822* (2013.01); *H04L 12/1827* (2013.01)

(58) Field of Classification Search
CPC ............ H04L 65/4046; H04L 12/1822; H04L 12/1827
See application file for complete search history.

(56) References Cited

U.S. PATENT DOCUMENTS

| | | | |
|---|---|---|---|
| 8,095,120 B1 | 1/2012 | Blair et al. | |
| 8,224,305 B2 | 7/2012 | Gupta | |
| 8,319,816 B1 * | 11/2012 | Swanson | ................ H04N 7/152 348/14.01 |
| 8,737,273 B1 | 5/2014 | Jones et al. | |

(Continued)

FOREIGN PATENT DOCUMENTS

EP          2852092          3/2015

*Primary Examiner* — Ninos Donabed
*Assistant Examiner* — Raqiul A Choudhury
(74) *Attorney, Agent, or Firm* — Trop Pruner & Hu PC

(57) ABSTRACT

Examples pertain to a system and method for enabling users to participate on a network conferencing session. In some examples, a first user device, using a network interface, can establish an independent network connection with a remote computer system that hosts a network conferencing session. In addition, the first user device, using a local wireless connection, can communicate with at least a second user device that is independently connected to the remote computer system. During the conferencing session, the first user device, using the local wireless connection, can direct a first audio input received on the first user device to the second user device for forwarding to the remote computer system, while maintaining the independent network connection with the remote computer system.

16 Claims, 8 Drawing Sheets

(56) References Cited

U.S. PATENT DOCUMENTS

| | | |
|---|---|---|
| 2008/0183818 A1* | 7/2008 | Farshchi .................. H04L 67/14 709/205 |
| 2009/0264114 A1 | 10/2009 | Virolainen et al. |
| 2011/0270923 A1 | 11/2011 | Jones et al. |
| 2011/0280387 A1* | 11/2011 | Soo ......................... H04M 3/56 379/202.01 |
| 2012/0140681 A1 | 6/2012 | Kaminsky et al. |
| 2012/0147123 A1 | 6/2012 | Lian et al. |
| 2012/0169836 A1* | 7/2012 | Setlur ................. H04L 12/1827 348/14.11 |
| 2014/0022889 A1* | 1/2014 | Syrett ..................... H04M 3/56 370/216 |
| 2014/0111597 A1 | 4/2014 | Anderson et al. |
| 2016/0014373 A1* | 1/2016 | LaFata ................... H04N 7/152 348/14.08 |
| 2016/0150011 A1* | 5/2016 | Le Nerriec ........ H04N 21/4307 709/205 |
| 2017/0230506 A1 | 8/2017 | Maski |
| 2018/0075395 A1* | 3/2018 | Mizumoto ............ G10L 15/222 |
| 2019/0158440 A1* | 5/2019 | Abuelsaad .............. H04L 51/14 |
| 2020/0412561 A1* | 12/2020 | DeLuca .............. H04L 12/1818 |

* cited by examiner

100

Local Wireless Communication Interface 140

-Leader Instructions 141

Network Interface 130

Instruction Set 132

-Remote Connection Instructions 133
-Local Connection Instructions 135
-Forwarding Instructions 137
-Leader Determination Instructions 139

Memory 120

Processor 110

FIG. 1B

MAINTAINING INDEPENDENT NETWORK CONNECTIONS FOR USER DEVICES IN CONFERENCING SESSIONS

BACKGROUND

Computer systems that host conferencing sessions enable users to meet and collaborate through the exchange of real-time data streams (e.g., audio, video, etc.). In group settings, multiple user devices (e.g., smartphones) can be utilized to participate in conferencing sessions.

BRIEF DESCRIPTION OF THE DRAWINGS

FIG. 1B illustrates an example first user device which is modal, to operate as either a leader or non-leader device during the network conferencing session.

DETAILED DESCRIPTION

Examples pertain to a system and method for enabling users to participate on a network conferencing session. In some examples, a user device can include a network interface, a local wireless communication interface, a memory to store a set of instructions, and a processor to execute the set of instructions. The processor can execute the set of instructions to establish, using the network interface, an independent network connection between at least a first user device and a remote computer system that hosts a network conferencing session. In addition, the processor can execute the set of instructions to enable the first user device to use a local wireless connection to communicate with at least a second user device that is independently connected to the remote computer system. During the conferencing session, the processor can execute the set of instructions to direct, using the local wireless connection, a first audio input received on the first user device to the second user device for forwarding to the remote computer system, while maintaining the independent network connection with the remote computer system.

Some examples described herein can involve the use of user devices, including processing and memory resources. For example, examples described herein may be implemented, in whole or in part, on user devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, examples described herein may be implemented through the use of instructions that are executable by a processor. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1A:
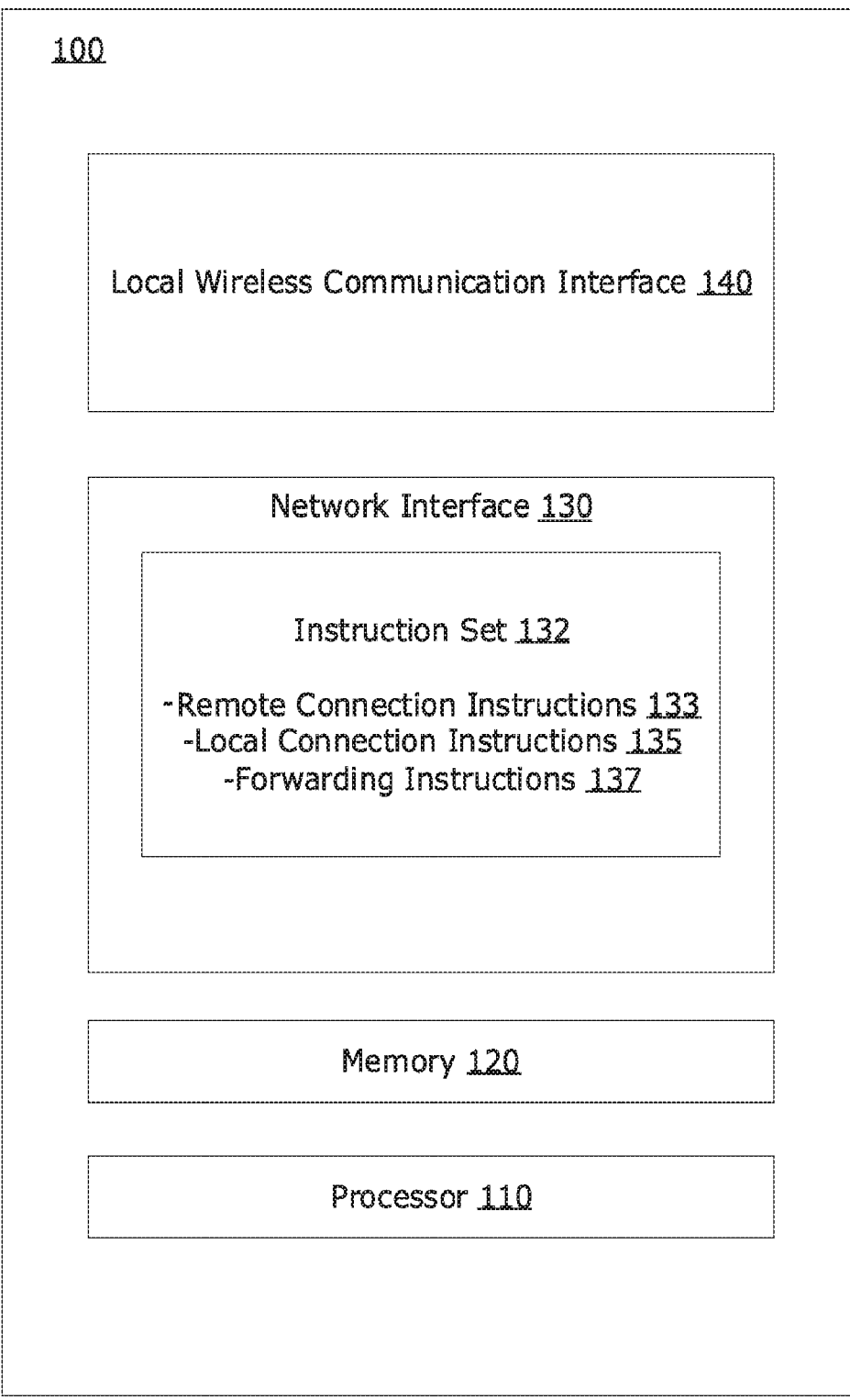
FIG. 1A illustrates an example first user device for implementing a network conferencing session.

FIG. 1A illustrates an example user device for implementing a network conferencing session. Typically, user devices utilized to participate in network conferencing sessions may not be ideally positioned to pick up audio from every user participating in the network conferencing session or may become disconnected from the network conferencing session, potentially disrupting the flow of the session. In examples, the user device 100 can enable users of a network conferencing session to co-locate in a room or other co-located space, while enabling each participant to utilize their respective user device as an audio input and/or output device for the network conferencing session. For example, users can bring their smartphones to a network conferencing session and utilize the microphones and speakers of their respective smartphones to participate in the network conferencing session. In this way, the close proximity between users and the microphones/speakers provides a highly localized teleconferencing environment for each participant of the co-located space. In the highly-localized teleconferencing environment, each participant can, for example, speak or listen through their-own user device which can be held or placed in front of them, rather than using a shared microphone or speaker that can lose clarity, quality or richness as a result of spacing and orientation.

In variations, participants can utilize the cameras of their respective user devices to capture video streams for a network conferencing session. In such variations, the user device can "promote" the video stream with the most activity (e.g., persons interacting) or strongest audio stream (e.g., proximity to the active speaker) at a particular moment.

In the example of FIG. 1A, the first user device 100 can include a processor 110, a memory 120, a network interface 130 and a local wireless communication interface 140. The first user device 100 may correspond to, for example, a cellular telephony device (e.g., smartphone, feature phone, phablet, etc.), tablet, wearable device, laptop or notebook, or ultraportable user device. The network interface 130 can include a wireless port to enable the first user device 100 to send and/or receive network (e.g., Internet Protocol ("IP")) communications over, for example, a cellular network and/or other types of wireless networks (such as provided by any one of the 802.11 IEEE standards, including 802.11(a), 802.11(b), 802.11(g), 802.11(n), etc.)(collectively "Wi- Fi")). In examples, the first user device 100 can utilize the network interface 130 to access the remote computer system on which a network conferencing session that the respective user is participating on is being hosted. The local wireless communication interface 140 can include a wireless port for enabling short-range wireless communications, such as communications amongst participants in a common room. By way of example, the local wireless communication interface 140 can include a wireless port to enable the first user device 100 to communicate with one or multiple user devices using communication protocols such as provided by Bluetooth, wireless USB, or Wi-Fi Direct.

The first user device 100 can be operated by a user to communicate with a remote computer system, where a network conferencing session can be hosted for a group of participants that include the user of the first user device 100. In examples, the network interface 130 can store an instruction set 132 that the processor 110 can execute to implement localized conferencing functionality while the first user device 100 is co-located (e.g., in same room) as other users who are also participating in the same network conferencing session using different user devices. The instruction set 132 can be implemented as, for example, an application that the first user device 100 can execute to access and use a network conferencing service. In variations, the instruction set 132 can be implemented as a plug-in or auxiliary program for use with a network conferencing service and/or application.

According to some examples, the instruction set 132 can include remote connection instructions 133 that execute to enable the first user device 100 to establish a network connection with the remote computer system. The network connection can be formed over a network, such as over the World Wide Web, using the network interface 130. By using the network interface 130, the first user device 100 can form an independent network connection with the remote computer system, such that the connection formed with the remote computer system is persistent and unaffected by the connectivity status of other user devices (e.g., leader device) that is participating in the network conferencing session. The persistent connection can be maintained by normal communications traffic or by keep-alive packets (e.g., UDP packets, etc.).

The instruction set 132 can also include local connection instructions 135 for communicating with other user devices of users that are participating in the network conferencing session. For example, the processor 110 can execute the local connection instructions 135 to form a communication link with a second user device (or multiple other user devices) that is participating on the same network conferencing session, where the communication link is formed using the local wireless communication interface 140, and a communication protocol such as Bluetooth or WiFi Direct.

The processor 110 can execute audio forwarding instructions 137 that direct content (e.g., audio input received from a user of the first device 100) to another user device that operates as a leader of the network conferencing service by transmitting the content via the local wireless connection. The first user device 100 can, for example, receive audio input from a user of the first user device 100, and direct the audio input to another user device that is operating as the leader for the network conferencing session.

In some examples, the first user device 100 can implement alternative modes of operation for the network conferencing session. In a non-leader mode, the first user device 100 locally transmits audio input captured via the local microphone to a leader device of the network conferencing session.

FIG. 1B illustrates another example in which the first user device 100 is modal, to operate as either a leader or non-leader device during the network conferencing session. When operating as a non-leader device (e.g., such as described with an example of FIG. 1A), the processor 110 can execute leader determination instructions 139 to determine, or facilitate the determination of, a leader device for the network conferencing session. As a non-leader device, the processor 110 can further execute the leader determination instructions 139 to detect when the existing leader of the conferencing session disconnects from the network conferencing session. In such an event, the first user device 100 remains connected to the network conferencing session by way of the independent network connection formed between the first user device 100 and the remote computer system. Similarly, other user devices of the remaining group can remain connected. The processor 110 can, for example, execute the leader determination instructions 139 to select a new leader device for the network conferencing session from the remainder of the group of devices. Because all participants remain connected to the remote computer system, switching to a new leader is almost instantaneous so there is no audio disruption in the room or the remote computer system.

In examples, the first user device 100 can also be determined to be the leader device, either initially or in response to a predetermined event (e.g., existing leader disconnects from the network conferencing session). When operating as a leader device, the processor 110 can execute leader instructions 141 to receive audio input from the user of the first user device 100 (e.g., via a microphone), as well as audio inputs communicated from other user devices of the group (received over the local wireless communication interface 140). The first user device 100 can execute the leader instructions to perform operations such as combining the respective audio inputs (including those captured on the first user device) into a digital stream that is transmitted to the remote computer system. For example, the first user device 100 can send an audio stream of its own microphone input augmented with the microphone inputs captured from the microphones of other participants of the same network conferencing session. The first user device 100 can also receive session content (e.g., audio input) from the remote computer system, and distribute the session content to the other user devices using the local wireless connection formed through the local wireless communication interface 140.

Figure 2A:
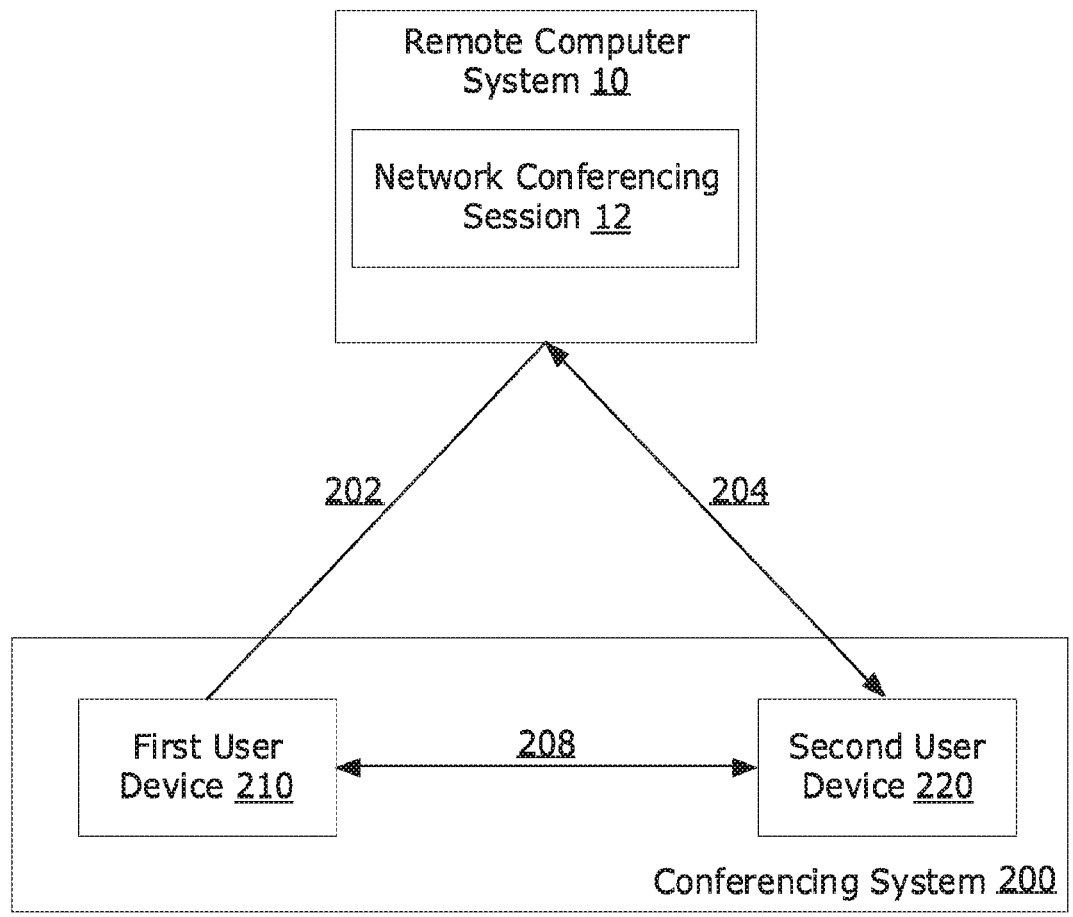
FIG. 2A illustrates an example conferencing system by user devices such as shown by the examples of FIG. 1A and FIG. 1B.

FIG. 2A illustrates an example conferencing system 200 by user devices such as shown by the examples of FIG. 1A and FIG. 1B. In the example of FIG. 2A, the remote computer system 10 provides conferencing services on which the network conferencing session 12 is provided. Each user device in a group of user devices can connect to the remote computer system 10 via its respective independent network connection. For example, in FIG. 2A, the first user device 210 and the second user device 220 constitute a group of user devices. Further, the first user device 210 connects to the remote computer system 10 via an independent network connection 202, and the second user device 220 connects to the remote computer system 10 via an independent network connection 204. The independent network connections for the different user devices can be established over different cellular networks or wireless networks. For example, the first user device 210 can include a smartphone and the second user device 220 can include a laptop computer. The independent network connection for the smartphone can be established over a 4G cellular network, while the independent network connection for the laptop can be established over a WiFi network. In addition, the independent network connection for each user device can change during the course of the network conferencing session. For example, a smartphone can initially establish its independent network connection through a WiFi network, but, during the course of the conferencing session, the WiFi connection can fail or become corrupted, prompting the smartphone to re-establish its independent network connection through an available cellular network.

In addition, in FIG. 2A, each user device in the group can connect to each other via a local wireless connection. For example, a local connection between the first user device 210 and the second user device 220 can be established via a local wireless connection 208. The local wireless connection 208 can create a local communications network between the user devices (e.g., mesh network, ad hoc network, etc.) by way of a wireless communications protocol associated with the user devices (e.g., WiFi Direct, Bluetooth, etc.). For example, once the first and second user devices 210, 220 establish their respective independent network connections to the remote computer system 10, each device can search for local peers connected to the same remote computer system 10 with the same unique identifier (e.g., code unique to each network conferencing session) acquired when joining the network conferencing session. Each device can broadcast (e.g., over Bluetooth Low-Energy) the identity of its remote computer system connection and its unique identifier. If the devices are connected to the same remote computer system with the same unique identifier for the network conferencing session, then the devices can form a local peer group.

Once the user devices in the group have established their respective local wireless connections to each other, a leader of the group can be elected. The leader of the group can act as an intermediary through which communications flow between the group of user devices (e.g. 210, 220, 230, etc.) and the remote computer system 10. In some examples, the leader can receive a data stream from the remote computer system 10 and distribute the data stream to the other devices in the group. In other examples, the leader can receive a data stream from each respective user device in the group, combine the data streams and transmit the combined data stream to the remote computer system 10. In such examples, despite the non-leader user devices having established an independent network connection to the remote computer system 10, data streams are forwarded through and distributed by the leader user device. In this way, out-of-sync audio issues and/or feedback issues from multiple microphones/speakers of each device can be avoided. For example, the leader device can include instructions to implement digital signal processing operations for the digital streams for each respective user device in the group. The digital signal processing operations can include digital filtering, frequency domain analysis, wavelet transform, etc.

In the example of FIG. 2A, the second user device 220 is the leader. An operation can be implemented to elect a leader from the group of user devices that have established independent network connections to the remote computer system 10 and local wireless connections to each other. The operation can weigh several factors and assign numeric scores related to such factors as part of a general voting process to determine which user device in the group is best equipped to perform the tasks of the leader. For example, factors can include, but are not limited to, bandwidth availability, processing power, matrix arithmetic benchmark results, power availability, etc. In the example of FIG. 2A, the first user device 210 can include a smartphone connected to the remote computer system 10 through a 3G cellular network, and the second user device 220 can include a laptop computer connected to the remote computer system 10 through a WiFi network. Due to the typically greater processing power of laptop computers as compared to smartphones and the faster bandwidth of WiFi as compared to cellular networks, the second user device 220 can be assigned a higher numeric score and accordingly can be elected the leader of the group of user devices.

In some examples, the numeric score assigned to a particular user device to assess its capacity for performing the functions of the leader can be adjusted. For example, a user device that was not elected as the leader due to its low power capacity can be reassigned a higher score if, during the course of the network conferencing session, that particular user device is plugged in to an external power source so as to negate any consequences related to power availability. In addition, a user device that subsequently joins the network conferencing session (e.g., establishes an independent network connection to the remote computer system 10 and a local wireless connection to the group of user devices) can be assigned a higher numeric score than the leader currently forwarding and distributing data streams for the network conferencing session. In such instances, the user device that subsequently joins the network conferencing session can become the new leader if the current leader drops off the session or nears an anticipated drop off (e.g., slow performance, low power, etc.), or the user device that subsequently joins the network conferencing session can be elected the new leader at some point before the current leader drops off or nears an anticipated drop off.

In other examples, an established leader can drop off of a conferencing session. In such examples, a new leader is elected from the group of non-leader user devices by utilizing the same leader election operation discussed above. Once elected, the new leader performs the functions of the previous leader in that communications traveling between the group of devices and the remote computer system 10 run through the new leader. In addition, to ensure minimal to no lag in the flow of the network conferencing session, the new leader utilizes its already established independent network connection to perform the functions of the new leader. In this way, the independent network connections to the remote computer system 10 for each non-leader provide a "stand by" mode in the event that the independent network connection between the leader and the remote computer system 10 fails or becomes corrupted. Accordingly, during an individual network conferencing session, multiple different leaders can be utilized to forward and/or distribute data streams.

Figure 2B:
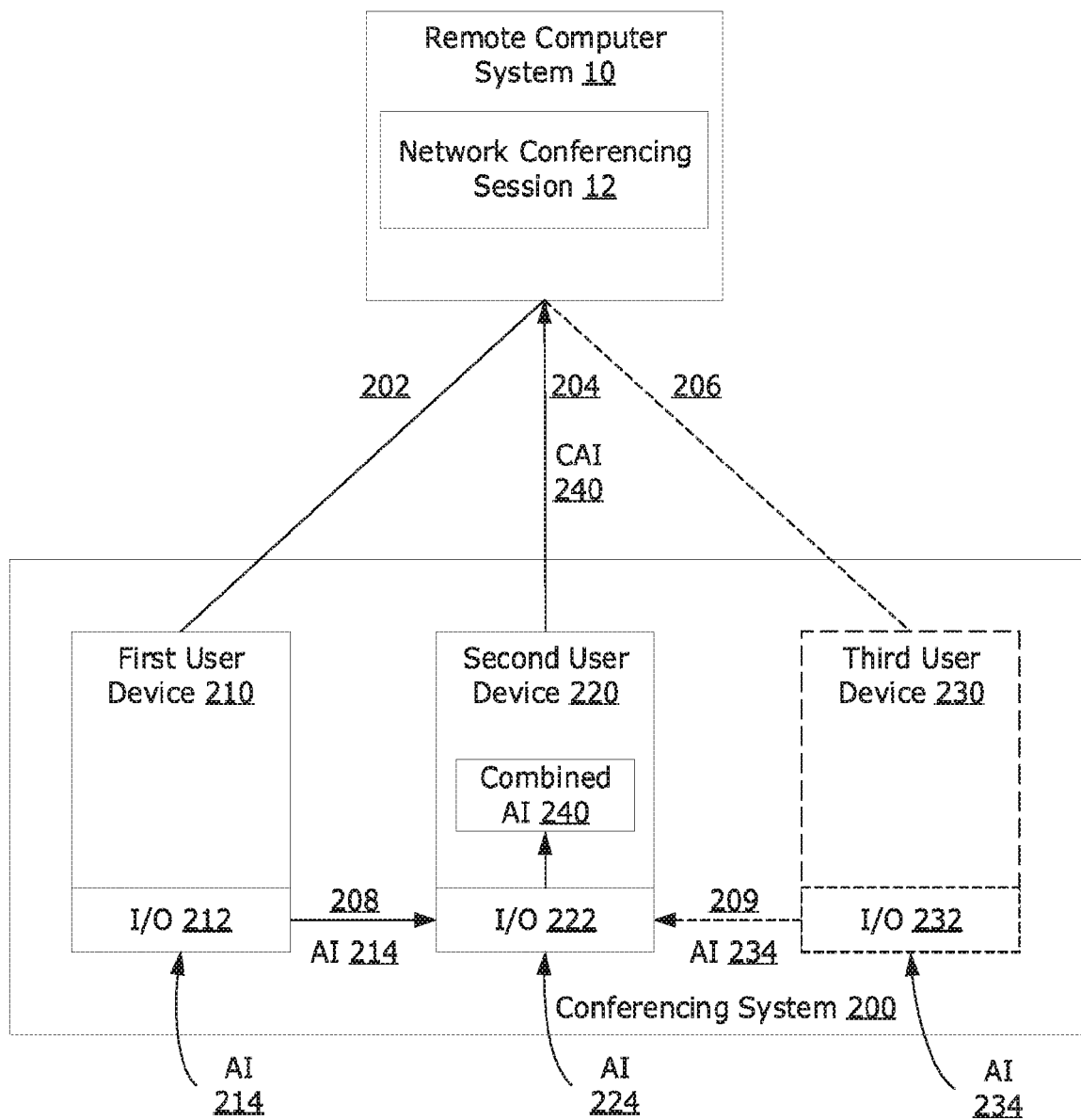
FIG. 2B illustrates the example computer system of FIG. 2A in which the leader device forwards audio to the remote computing system.

FIG. 2B illustrates the example computer system of FIG. 2A in which the leader device forwards audio to the remote computing system. The conferencing system 200 can include at least a first and second user device 210, 220, although multiple other user devices (e.g. third user device 230) may establish an independent network connection to the remote computer system 10 (e.g., independent network connection 206), as well as a local wireless connection to the group of devices (e.g., local wireless connection 209) at any point during the network conferencing session. In the example of FIG. 2B, the second user device 220 is the leader and the first user device 210 is the non-leader. As such, the first user device 210 directs its data streams (e.g., audio, video, text, etc.) in real time to the second user device 220 for forwarding to the remote computer system 10.

In an example, the first user device 210 can receive an audio input 214 from a user of the first user device 210 via an input/output component 212 (e.g., microphone, camera, etc.). The audio input 214 (e.g., voice of the user of the first user device 210) can be forwarded to the second user device 220 via the local wireless connection 208 (e.g., Bluetooth, etc.). In addition, the second user device 220 can receive an audio input 224 from a user of the second user device 220 via an input/output component 222 (e.g., microphone, camera, etc.). The two audio inputs 214, 224 can be combined to create a combined audio input 240, which can be forwarded to the remote computer system 10 by the second user device 220 over its independent network connection 204. In combining the data streams from the various user devices in the group, the leader device can implement instructions to improve the audio quality of the stream (e.g., digital sound processing operations to remove speaker feedback from the stream, etc.). In instances where multiple other user devices are added to the group during the network conferencing session (e.g., third user device 230), the respective audio inputs of the additional user devices (e.g., audio input 234) can also be included in the combined audio stream.

Unlike audio streams from multiple different user devices, which can frequently overlap and can be combined for transmittal to the remote computer system 10, some data streams are not suitable for overlap and/or combination (e.g. video streams, screen sharing, etc.). In such examples, data streams from multiple devices can be received at the leader device but only one stream can be promoted to the remote computer system. For example, video streams from multiple user devices can be received by the leader device but only an individual video stream from one of the user devices in the group can be promoted to the remote computer system. In some examples, a user device can be set as the designated user device to promote the video stream. In such examples, the leader can still act to combine and forward the audio streams from the other user devices in the group (including the leader device) to the remote computer system 10 in real time. In other examples, a user device can be elected "on the fly" to promote its video stream based on several factors. In such examples, the leader device can promote the video stream that includes the most activity (e.g., persons interacting), the video stream that correlates with the stronger audio stream (e.g., proximity to the speaker), etc.

Figure 2C:
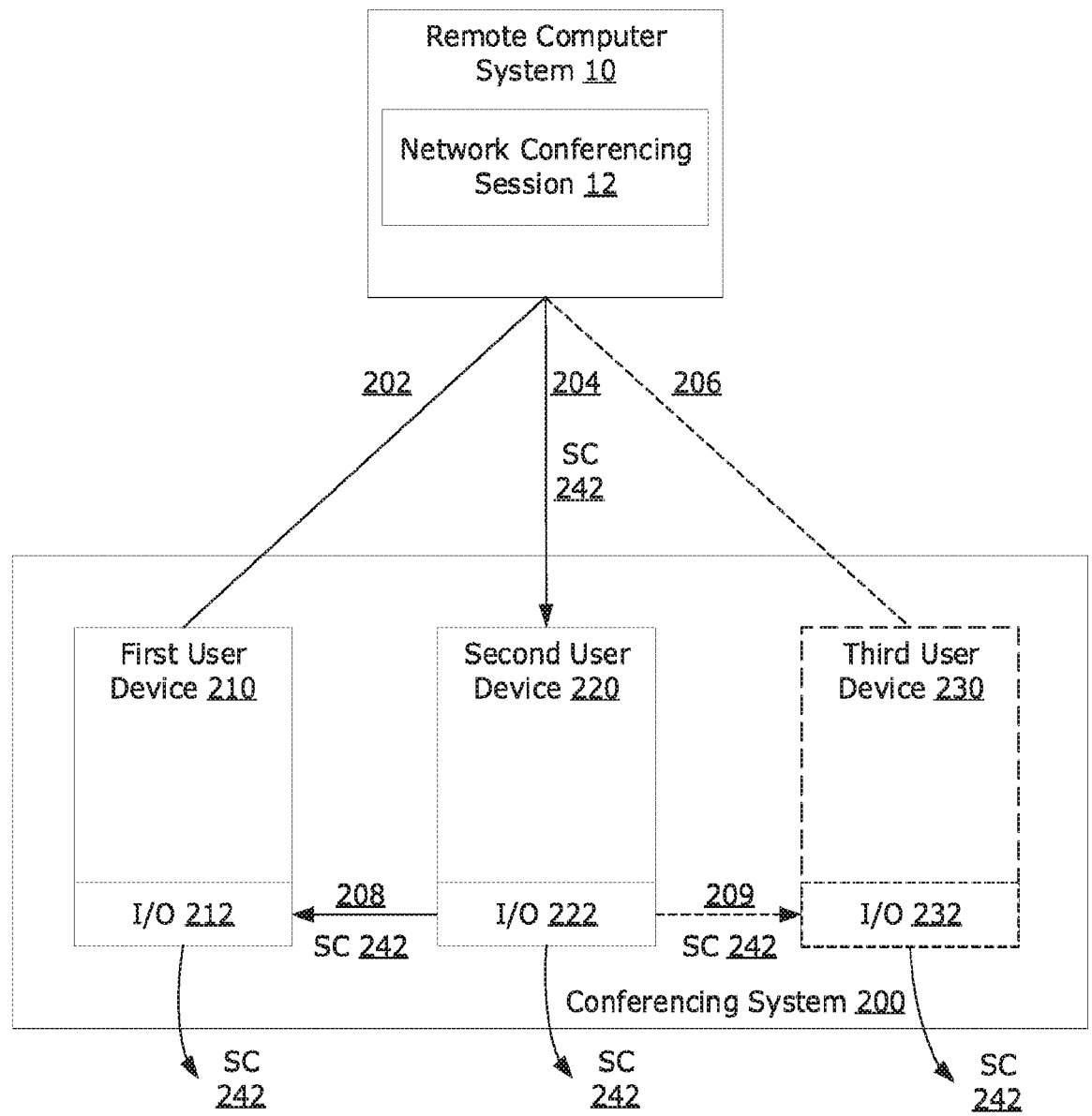
FIG. 2C illustrates the example computer system of FIG. 2A in which the leader device distributes session content to the user devices in the group.

FIG. 2C illustrates the example computer system of FIG. 2A in which the leader device distributes session content to the user devices in the group. The conferencing system 200 can include at least a first and second user device 210, 220, although multiple other user devices (e.g. third user device 230) may establish an independent network connection to the remote computer system 10 (e.g., independent network connection 206), as well as a local wireless connection to the group of devices (e.g., local wireless connection 209) at any point during the conferencing session. In the example of FIG. 2C, the second user device 220 is the leader and the first user device 210 is the non-leader. As such, the second user device 220 receives session content (e.g., audio, video, etc.) from the remote computer system 10 for distribution to the other user devices in the group. For example, the second user device 220 receives session content 242 from the remote computer system 10 over its independent network connection 204. The second user device 220 can distribute the session content 242 to the first user device 210 via the local wireless connection 208. In addition, the leader device can synchronize the distribution of the session content (e.g., session content 242) so that the session content is broadcast simultaneously across all the devices in the group. For example, session content 242 being broadcast from the first user device 210 can be synchronized with session content 242 being broadcast from the second user device 220. In this way, the user devices create a multi-speaker system in which each speaker can be in close proximity to each respective user.

Figure 3:
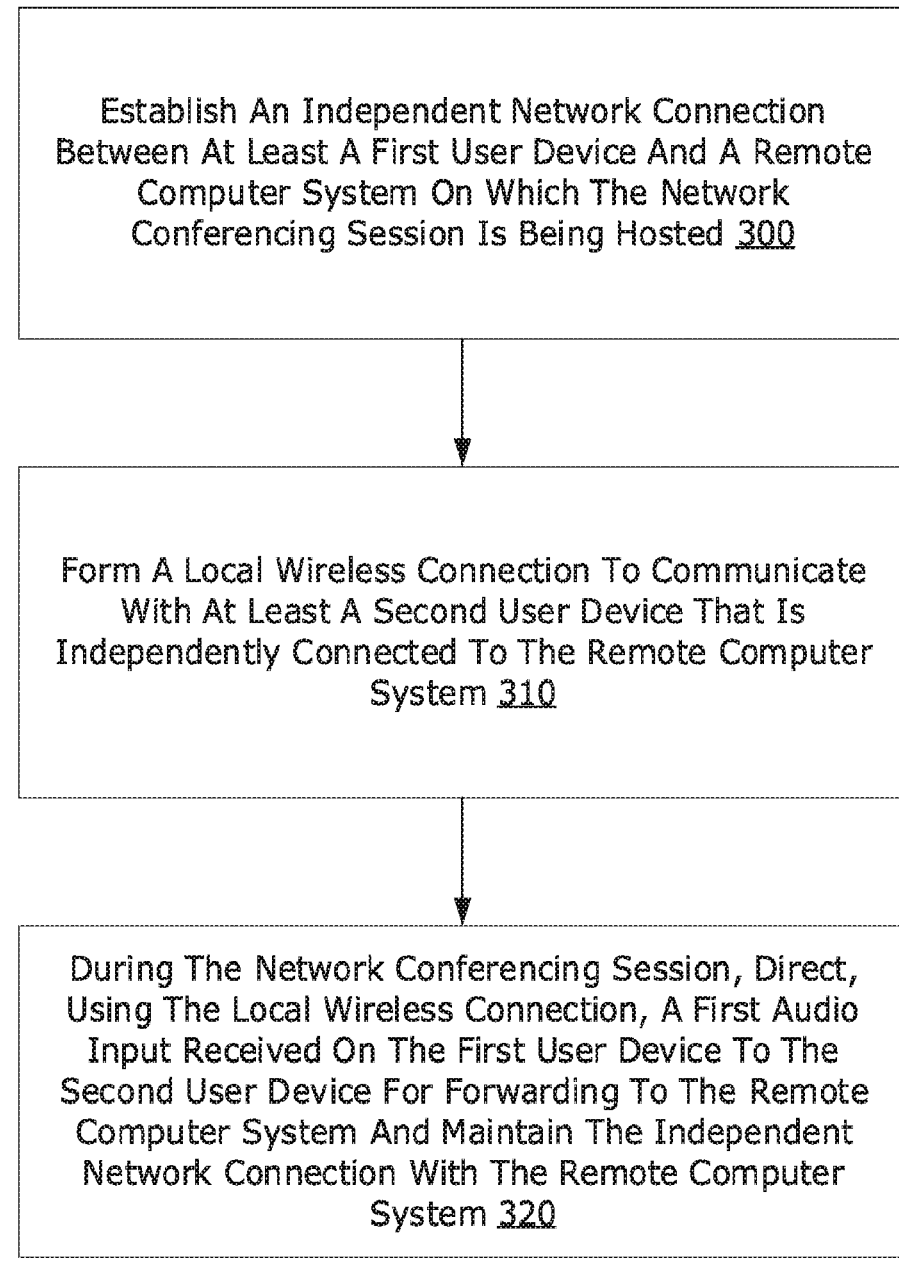
FIG. 3 illustrates a method for enabling users to participate on a network conferencing session.

FIG. 3 illustrates a method for enabling users to participate on a network conferencing session. Example methods such as described by examples of FIG. 3 can be implemented using example user devices and computer systems such as described with the examples of FIG. 1A to FIG. 1B and FIG. 2A to FIG. 2C. Accordingly, reference is made to the elements described with the examples of FIG. 1A to FIG. 1B and FIG. 2A to FIG. 2C to illustrate suitable components for implementing the method being described.

In the method of FIG. 3, an independent network connection can be established between at least a first user device and a remote computer system on which the network conferencing session is being hosted (200). By establishing the independent network connection with the remote computer system, the first user device, in effect, joins the network conferencing session. When joining the network conferencing session, the first user device, as well as subsequent user devices that join the network conferencing session, receives an identifier (e.g., unique conference ID) so that the user devices can locate each other and avoid jumping onto different conferencing sessions that may be taking place nearby. In addition, the independent network connections are maintained throughout the entirety of the conferencing session barring any corruption or failure of the user device (e.g., battery dies) or the independent network connection (e.g., WiFi failure).

In further reference to FIG. 3, the first user device can be enabled to use a local wireless connection to communicate with at least a second user device that is independently connected to the remote computer system (310). Once the independent network connections for each of the user devices participating on the network conferencing session have been established (which can include acquiring an identifier for the network conferencing session), the user devices can create a local wireless connection by searching for other user devices within range (e.g., Bluetooth, WiFi direct, etc.) and with the same identifier for the session.

Once the local wireless connections have been established, a leader is elected by analyzing which user device is best equipped for the task of forwarding data streams from the group of user devices as well as distributing data streams from the remote computer system. In analyzing which user device is best equipped to serve as the leader, factors such as bandwidth availability, processing power, matrix arithmetic benchmark results, power availability, etc. are considered.

Regarding bandwidth, a numeric score can be assigned to each user device based on available network bandwidth. For example, user devices connected via broadband links score higher than user devices connected via links such as 3G connections. Regarding processing power, a numeric score can be assigned to each user device based on raw computing power with the expectation that a leader with excess CPU capability is better suited for handling the audio processing tasks. For example, in some instances, a laptop computer can provide greater processing power than a smartphone and therefore can be assigned a higher numeric score. Regarding matrix arithmetic benchmark results, a numeric score can be assigned based on the capacity of the user device to execute matrix operations, which can be integral to digital signal processing operations. For example, a user device with a dedicated graphics processing unit would be assigned a higher numeric score than a user device without. Regarding power availability, a numeric score can be assigned to each user device based on the available charge (if running on battery) or whether the user device is plugged in. In such examples, a higher numeric score can be skewed to the user device least likely to drop out due to running out of power.

While the device with the highest numeric score can be elected the leader, the scores can be adjusted throughout the course of the network conferencing session. In reference to FIG. 2B, the first user device 210 and the second user device 220 can establish respective independent network connections 202, 204 with the remote computer system 10, and can establish a local wireless connection 208 with each other. Further, the second user device 220 can be elected leader of the group of user devices. After the leader has been elected, the third user device 230 can join the network conferencing session by establishing its own independent network connection 206 with the remote computer system 10 and by establishing a local wireless connection 209 with the leader or second user device 220. In some instances, the numeric score assigned to the third user device 230 can be greater than the numeric score assigned to the second user device 220, indicating that the third user device 230 may be better suited to perform the functions of the leader. For example, the second user device 220 can be an unplugged smartphone connected to the remote computer system 10 via a wireless network, and the third user device 230 can be a laptop computer connected to the remote computer system 10 via the same wireless network and further include a dedicated graphics processing unit and can be plugged into an external power source, thereby warranting a higher score for the laptop.

In some examples, in which the adjusted score of a non-leader is greater than that of the leader, the conferencing system can switch leaders. For example, in reference to FIG. 2B, the third user device 230 can become the leader upon the determination that the score for the third user device 230 is greater than the score for the second user device 220. In other examples, the second user device 220 can remain as the leader until the second user device 220 can no longer perform the functions of the leader (e.g., battery dies, WiFi connection fails, etc.) or if it is anticipated that the second user device 220 can no longer perform the functions of the leader (e.g., battery low, WiFi connection weak, etc.). In these examples, the non-leader devices maintain their respective independent network connections to the remote computer system to provide a "stand by" mode, so that when a non-leader becomes a leader, the switching process is instantaneous and does not disrupt the network conferencing session.

In addition, in FIG. 3, during the network conferencing session, a first audio input received on the first user device can be directed, using the local wireless connection, to the second user device for forwarding to the remote computer system while maintaining its independent network connection with the remote computer system (320). For example, in FIG. 2B, the second user device 220, acting as leader, forwards audio input from the first user device 210 (e.g., audio input 214), the second user device 220 (e.g., audio input 224) and the third user device 230 (e.g., audio input 234) as a combined audio input 240 to the remote computer system 10. The leader can also receive other data streams (e.g., video, text, screen sharing) for forwarding to the remote computer system 10. In addition, in FIG. 2C, the second user device, acting as leader, can receive incoming session content 242 from the remote computer system 10 for distribution to the other user devices in the group. In such instances, even though the second user device 220 first receives the incoming data stream from the remote computer system 10 via its independent network connection 204, the second user device 220 synchronizes the distribution of the session content 242 so that the session content is broadcast over all the user devices in the group simultaneously. In this way, the user devices in the group provide audio that fills the room, avoiding the shortcomings of some approaches (e.g., difficulty understanding audio due to a speaker's distance from speakers, etc.).

Figure 4A:
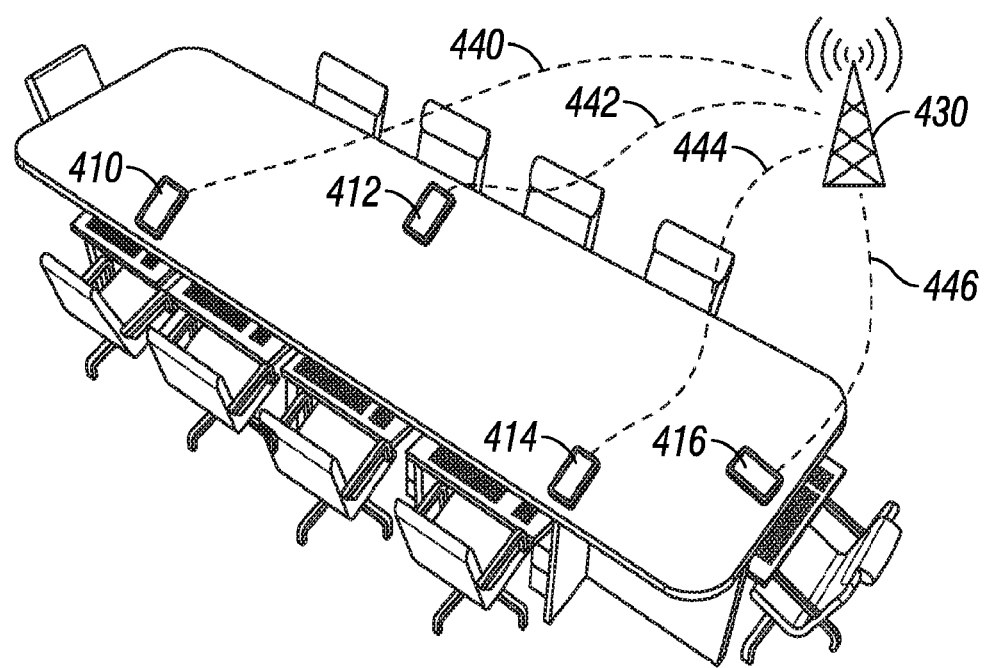
FIG. 4A to FIG. 4D illustrate another example method for enabling users to participate on a network conferencing session.
Figure 4B:
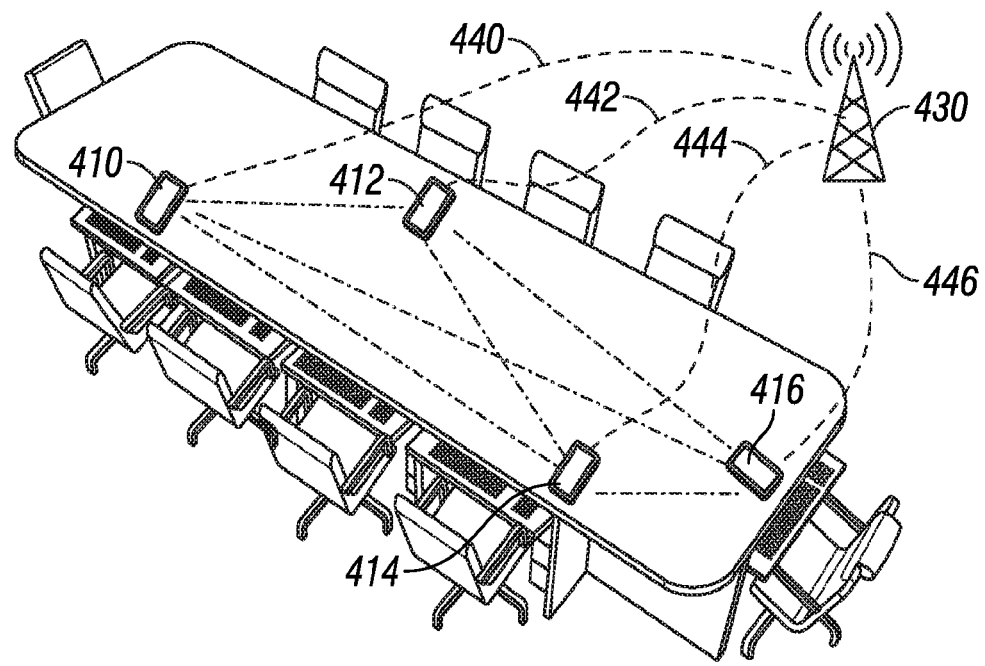
Figure 4C:
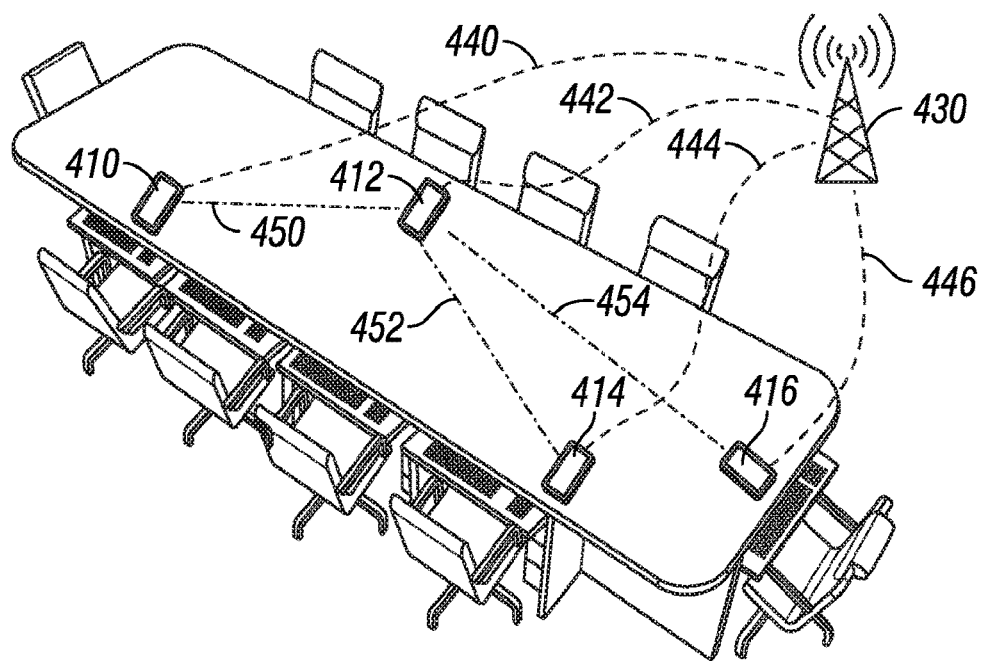
Figure 4D:
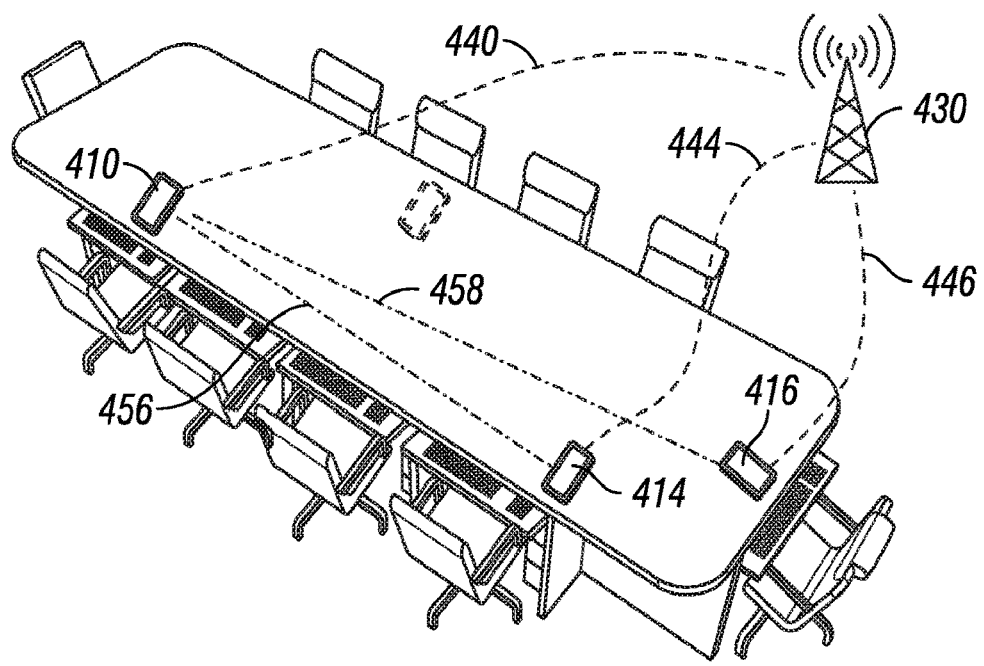

FIG. 4A to FIG. 4D illustrate another example method for enabling users to participate on a network conferencing session. In FIG. 4A, mobile devices 410, 412, 414 and 416 establish respective independent network connections 440, 442, 444 and 446 to the remote computer system 430, and obtain a conference identifier specific to their conferencing session. In FIG. 4B, the mobile devices 410, 412, 414 and 416 search for peers with the same conference identifier and within Bluetooth range, and analyze the criteria discussed above regarding leader election. In FIG. 4C, local wireless connections 450, 452, and 454, are established, and mobile device 412 is elected leader. As such, the non-leader mobile devices 410, 414 and 416 will direct their data streams to mobile device 412 via their respective local wireless connections 450, 452 and 454 for forwarding to the remote computer system 430, while maintaining their respective independent network connections 440, 444 and 446 with the remote computer system 430. In FIG. 4D, mobile device 412 drops out as leader. Accordingly, mobile device 410 is elected as the leader and the remaining mobile devices 414 and 416 establish new local wireless connections 456 and 458 with mobile device 410, while still maintaining their respective independent network connections 444 and 446. As the new leader, the mobile device 410 forwards and distributes data streams between the mobile device 414 and 416 and the remote computer system 430 by utilizing its independent network connection 440.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A method for enabling users to participate in a network conferencing session, the method comprising:

establishing a first independent network connection between a first user device and a remote computer system on which the network conferencing session is hosted, wherein the first user device has a first microphone;

forming a local wireless connection between the first user device and a second user device that has a second independent network connection with the remote computer system, wherein the second user device has a second microphone;

selecting, from among a group of user devices that includes the first user device and the second user device, the second user device as a leader device for the network conferencing session;

during the network conferencing session, directing, using the local wireless connection, a first audio input received by the first microphone of the first user device to the second user device as the leader device that combines the first audio input with a second audio input received by the second microphone of the second user device, the combining producing combined audio forwarded by the second user device to the remote computer system while the first user device maintains the first independent network connection with the remote computer system; and in response to an event in which the leader device leaves the network conferencing session, selecting the first user device as a new leader device from a remainder of the group of user devices, the new leader device utilizing the first independent network connection maintained by the first user device to the remote computer system to perform functions of the new leader device, the selecting of the first user device as the new leader device based on relative available battery power of the user devices of the remainder of the group of user devices.

2. The method of claim 1, wherein establishing the first independent network connection, forming the local wireless connection, and directing the first audio input are performed at the first user device.

3. The method of claim 1, comprising forwarding, by the second user device, the combined audio to the remote computer system over the second independent network connection.

4. The method of claim 1, further comprising:
at the second user device, receiving session content from the remote computer system; and
distributing the session content from the second user device to the first user device using the local wireless connection.

5. The method of claim 1,
wherein the selecting of the second user device as the leader device is based on relative features of respective user devices of the group of user devices, the relative features selected from among relative network bandwidths available to the respective user devices, relative processing powers of the respective user devices, or relative available battery power of the respective user devices.

6. A first user device comprising:
a first microphone to receive a first audio input;
a network interface;
a local wireless communication interface;
a processor; and
a non-transitory storage medium storing instructions executable on the processor to:
establish, using the network interface, a first independent network connection between the first user device and a remote computer system on which a network conferencing session is hosted;
form a local wireless connection to communicate with a second user device that has a second independent network connection to the remote computer system and that has a second microphone;
select, from among a group of user devices that includes the first user device and the second user device, the second user device as a leader device for the network conferencing session;

during the network conferencing session, direct, over the local wireless connection to the second user device, the first audio input received by the first microphone, the second user device as the leader device to combine the first audio input and a second audio input received by the second microphone of the second user device, the combining to produce combined audio, the second user device to forward the combined audio to the remote computer system over the second independent network connection, while the first user device maintains the first independent network connection with the remote computer system, and in response to an event in which the leader device leaves the network conferencing session, select the first user device as a new leader device from a remainder of the group of user devices, the new leader device utilizing the first independent network connection maintained by the first user device to the remote computer system to perform functions of the new leader device, the selecting of the first user device as the new leader device based on relative available battery power of the user devices of the remainder of the group of user devices.

7. The first user device of claim 6, wherein the instructions are executable on the processor to update, during the network conferencing session, a numeric score for each respective user device among the group of user devices, the numeric score related to a capacity of the respective user device to operate as a leader device.

8. The first user device of claim 7, wherein the instructions are executable on the processor to:
direct the first audio input received at the first microphone to the second user device when the first user device is operating in a non-leader mode.

9. The first user device of claim 6, wherein the first selecting of the second user device as the leader device from the group of user devices is based on relative processing powers of respective user devices of the group of user devices.

10. The first user device of claim 6, wherein the instructions are executable on the processor to:
receive, over the local wireless communication interface, session content from the second user device, the session content sent by the remote computer system.

11. The first user device of claim 6, wherein the first selecting of the second user device as the leader device from the group of user devices is based on relative network bandwidths available to respective user devices of the group of user devices.

12. A non-transitory computer-readable medium comprising instructions that, when executed by a first user device, cause the first user device to:
establish a first independent network connection between the first user device and a remote computer system on which a network conferencing session is hosted;
form a local wireless connection to communicate with a second user device that has a second independent network connection to the remote computer system;
select, from among a group of user devices that includes the first user device and the second user device, the second user device as a leader device for the network conferencing session;

during the network conferencing session:
  receive, from a first microphone of the first user device, a first audio,
  direct the first audio from the first user device to the second user device over the local wireless connection, the second user device as the leader device to combine the first audio and a second audio received by a second microphone of the second user device to form combined audio, the second user device to forward the combined audio to the remote computer system over the second independent network connection, while the first user device maintains the first independent network connection with the remote computer system; and
  in response to an event in which the leader device leaves the network conferencing session, select the first user device as a new leader device from a remainder of the group of user devices, the new leader device utilizing the first independent network connection maintained by the first user device to the remote computer system to perform functions of the new leader device, the selecting of the first user device as the new leader device based on relative available battery power of the user devices of the remainder of the group of user devices.

13. The method of claim 1, further comprising:
  receiving, at the second user device, first video captured by a first camera of the first user device, and second video captured by a second camera of the second user device;
  selecting, at the second user device, a single video from among the first video and the second video; and
  sending, from the second user device, the selected single video to the remote computer system.

14. The method of claim 1, wherein the first independent network connection is a standby independent network connection for use when the second independent network connection fails.

15. The first user device of claim 6, wherein the selecting of the second user device as the leader device from the group of user devices is based on relative battery power of respective user devices of the group of user devices.

16. The non-transitory computer-readable medium of claim 12, wherein the selecting of the second user device as the leader device for the network conferencing session is based on relative features of respective user devices of the group of user devices, the relative features selected from among relative network bandwidths available to the respective user devices, relative processing powers of the respective user devices, or relative available battery power of the respective user devices.

* * * * *